United States Patent
Chue et al.

(10) Patent No.: US 6,943,972 B1
(45) Date of Patent: Sep. 13, 2005

(54) SELECTING A TRACK DENSITY FOR EACH DISK SURFACE OF A DISK DRIVE BASED ON HEAD CHARACTERISTIC

(75) Inventors: Jack M. Chue, Los Altos, CA (US);
William C. Tipton, II, Gilroy, CA (US); David P. Turner, Los Gatos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 255 days.

(21) Appl. No.: 10/609,066

(22) Filed: Jun. 27, 2003

(51) Int. Cl.[7] ................................................. G11B 5/09
(52) U.S. Cl. ........................................................ 360/48
(58) Field of Search ............................. 360/48, 17, 51, 360/75, 77.05, 78.04, 78.12

(56) References Cited

U.S. PATENT DOCUMENTS

| | | | |
|---|---|---|---|
| 5,901,010 A * | 5/1999 | Glover et al. ............ 360/78.12 |
| 5,949,603 A | 9/1999 | Brown et al. |
| 6,005,738 A * | 12/1999 | Chainer et al. ................ 360/75 |
| 6,031,680 A * | 2/2000 | Chainer et al. ................ 360/75 |
| 6,034,835 A * | 3/2000 | Serrano .................... 360/77.05 |
| 6,091,559 A | 7/2000 | Emo et al. |
| 6,130,796 A | 10/2000 | Wiselogel |
| 6,172,839 B1 | 1/2001 | Ahn |
| 6,262,857 B1 * | 7/2001 | Hull et al. ..................... 360/51 |
| 6,441,981 B1 * | 8/2002 | Cloke et al. ................... 360/51 |
| 6,445,525 B1 * | 9/2002 | Young .......................... 360/51 |
| 6,466,387 B1 | 10/2002 | Ogasawara et al. |
| 6,493,176 B1 | 12/2002 | Deng et al. |
| 6,643,090 B1 * | 11/2003 | Pruett ...................... 360/78.04 |
| 6,738,205 B1 * | 5/2004 | Moran et al. ................. 360/17 |
| 6,751,036 B2 * | 6/2004 | Quak et al. ................... 360/48 |

* cited by examiner

*Primary Examiner*—David Hudspeth
*Assistant Examiner*—Fred F. Tzeng
(74) *Attorney, Agent, or Firm*—Howard H. Sheerin, Esq.

(57) ABSTRACT

A method of selecting a track density for a disk surface of a disk drive is disclosed. A first pattern is written along a circumferential path of the disk surface, wherein the first circumferential path comprise a first set of arcuate sections interleaved with a second set of arcuate sections. A second pattern is written radially offset from the circumferential path during time intervals corresponding to the first set of arcuate sections. The head is positioned substantially over the center of the first circumferential path and during time intervals corresponding to the second set of arcuate sections, the first pattern is read to generate a first read signal amplitude measurement A0, and during time intervals corresponding to the first set of arcuate sections, the first pattern is read to generate a second read signal amplitude measurement A1. A track density is selected in response to A0 and A1, wherein the track density is for use in writing embedded servo sectors to the disk surface.

6 Claims, 4 Drawing Sheets

SELECTING A TRACK DENSITY FOR EACH DISK SURFACE OF A DISK DRIVE BASED ON HEAD CHARACTERISTIC

BACKGROUND OF THE INVENTION

1. Field of the Invention

The present invention relates to disk drives for computer systems. More particularly, the present invention relates to selecting a track density for each disk surface of a disk drive based on a head characteristic.

2. Description of the Prior Art

FIGS. 1A and 1B show a prior art head disk assembly (HDA) comprising a disk 2 having a top surface 4A and a bottom surface 4B. The disk 2 is rotated about a center axis while respective top and bottom heads 6A and 6B write and read data to/from the respective disk surfaces 4A and 4B. The heads 6A and 6B are attached to the distal end of respective actuator arms 8A and 8B which are rotated about a pivot by a voice coil motor (VCM) 10 in order to actuate the heads 6A and 6B radially over the disk surfaces 4A and 4B. Each disk surface 4A and 4B comprises a number of radially spaced, concentric tracks (e.g., tracks 12A on disk surface 4A) as defined by a number of embedded servo sectors (e.g., servo sectors 14A on disk surface 4A). The embedded servo sectors 14A are read by head 6A and processed by a servo control system in order to maintain the head 6A over a center of a target track while writing or reading data. The embedded servo sectors, 14A may be written to the disk surface 4A using an external servo writer or using internal circuitry during a self-servo writing process.

The overall recording density of each disk surface is determined in part by the track density or radial tracks per inch (TPI). Since the embedded servo sectors define the tracks, the track density is established when the embedded servo sectors are written to the disk during the servo writing process. The track density and therefore the recording density of the disk drive is limited by the characteristics of the head such as the width of the head. In the past, a nominal track density has been selected to servo write all of the disk surfaces corresponding to the average characteristics for the type of head used to manufacture a family of disk drives. If during a "burn-in" process of each disk drive the track density is found to be too high for any one of the heads, the entire disk drive may be discarded as defective, the head/disk replaced, or the respective disk surface marked as unusable.

U.S. Pat. No. 6,091,559 discloses a method for optimizing the track density for each disk surface by measuring a track width written by each head. The track width is measured by writing a first pattern to the disk, and then reading the first pattern to generate a first read signal amplitude measurement A0. A second pattern is then written on both sides of the first pattern at a predetermined radial offset, and the first pattern is read again to generate a second read signal amplitude measurement A1. A track density is selected for the disk surface in response to a ratio between the first and second read signal amplitude measurements A0 and A1. A problem with this technique is that the first pattern is read over two revolutions of the disk: once before the second pattern is written and again after the second pattern is written.

There is, therefore, a need for an improved technique for estimating the optimal track density of each disk surface in a disk drive.

SUMMARY OF THE INVENTION

The present invention may be regarded as a method for selecting a track density for a disk surface of a disk drive. The disk drive comprises a disk including the disk surface and a head actuated over the disk surface. A first pattern is written along a first circumferential path of the disk surface, wherein the first circumferential path comprises a first set of arcuate sections interleaved with a second set of arcuate sections. A second pattern is written along a second circumferential path during time intervals corresponding to the first set of arcuate sections, wherein the second circumferential path is radially offset from the first circumferential path. The head is positioned substantially over the center of the first circumferential path and during time intervals corresponding to the second set of arcuate sections, the first pattern is read to generate a first read signal amplitude measurement A0, and during time intervals corresponding to the first set of arcuate sections, the first pattern is read to generate a second read signal amplitude measurement A1. A track density is selected in response to A0 and A1, wherein the track density is for use in writing embedded servo sectors to the disk surface.

In one embodiment, the center of the first circumferential path is located prior to the steps of reading the first pattern to generate the first and second read signal amplitude measurements A0 and A1. The head is positioned at different locations with respect to the first circumferential path to read the first pattern, wherein the center of the first circumferential path is selected as the head position that maximizes the read signal amplitude.

In another embodiment, the track density is selected in response to a ratio of A1 to A0.

In yet another embodiment, the first pattern comprises a first fundamental frequency and the second pattern comprises a second fundamental frequency substantially different than the first fundamental frequency. In one embodiment, the first pattern writes a predetermined pattern of magnetic transitions on the disk surface and the second pattern writes a DC erase signal to the disk surface.

In one embodiment, prior to the step of positioning the head substantially over the center of the first circumferential path and reading the first pattern to generate the first and second read signal amplitude measurement A0 and A1, the head is positioned substantially over a center of a third circumferential path and the second pattern is written along the third circumferential path. The second circumferential path is radially offset in a first direction from the first circumferential path, the third circumferential path is radially offset in a second direction from the first circumferential path, and the first direction is substantially opposite the second direction.

DESCRIPTION OF THE PREFERRED EMBODIMENTS

Figure 2:
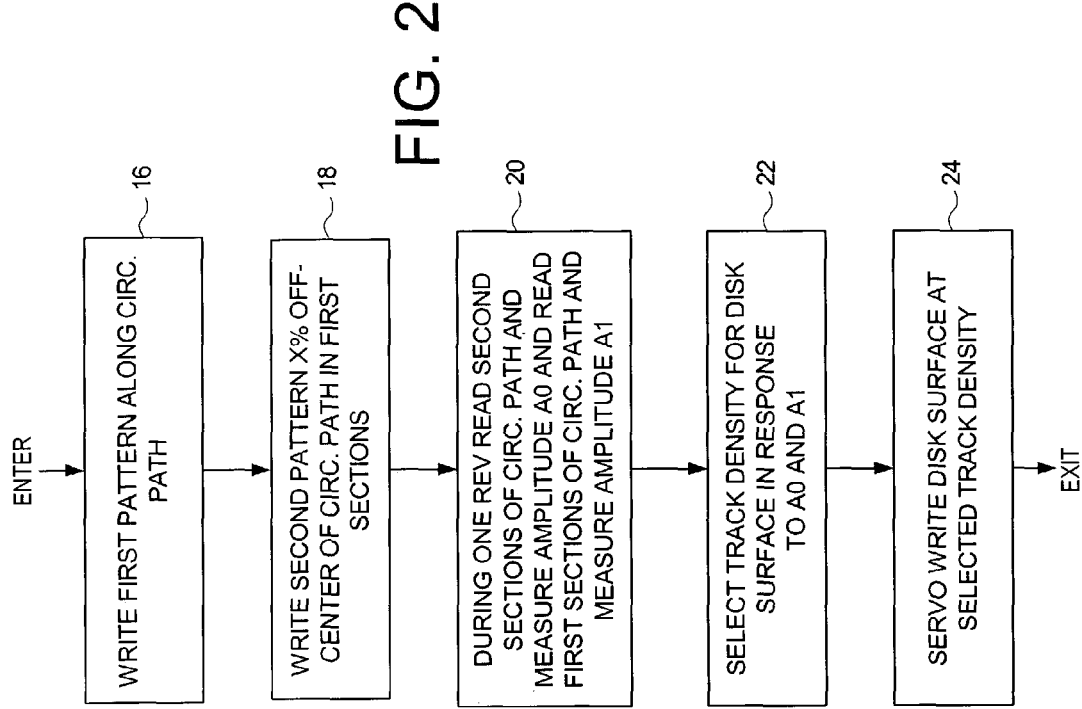
FIG. 2 is a flow diagram according to an embodiment of the present invention for selecting a track density of each disk surface by writing a primary pattern in first and second sections, writing an interference pattern radially offset from the primary pattern in the second sections, and reading the primary pattern during the first and second sections to generate a first and second read signal amplitude measurements A0 and A1.
Figure 1A:
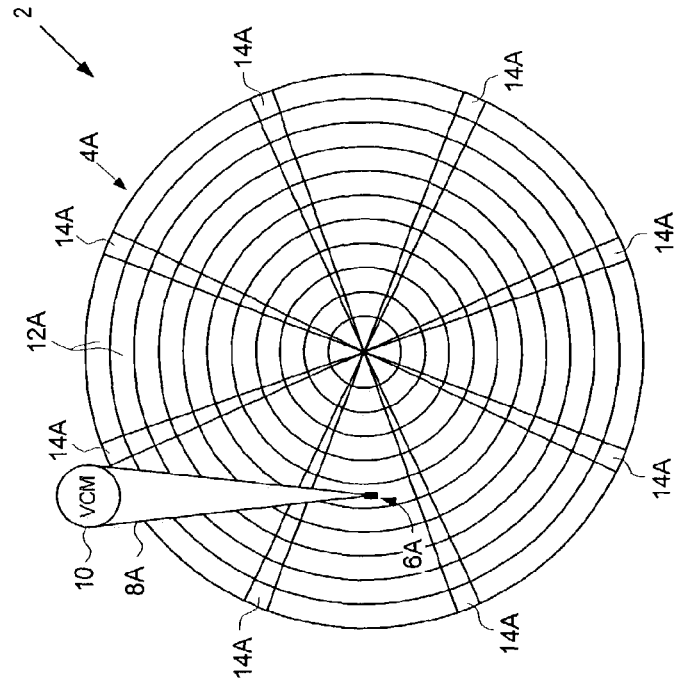
FIGS. 1A and 1B show a prior art head disk assembly (HDA) comprising a disk having a top surface and a bottom surface.
Figure 1B:
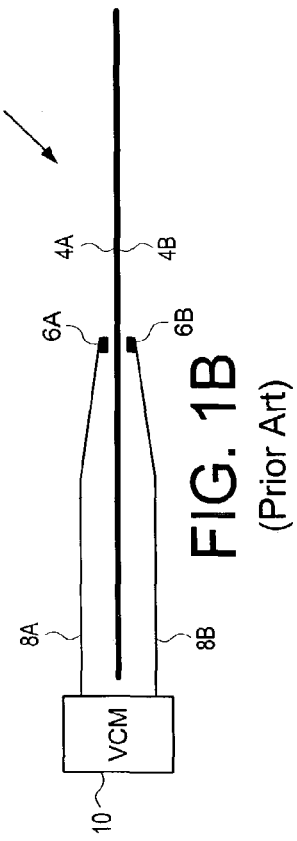

FIG. 2 shows a method for selecting a track density for a disk surface of a disk drive according to an embodiment of the present invention, wherein the disk drive comprises a disk including the disk surface and a head actuated over the disk surface. At step 16 a first pattern is written along a first circumferential path of the disk surface, wherein the first circumferential path comprises a first set of arcuate sections interleaved with a second set of arcuate sections. At step 18 a second pattern is written along a second circumferential path during time intervals corresponding to the first set of arcuate sections, wherein the second circumferential path is radially offset from the first circumferential path. At step 20 the head is positioned substantially over the center of the first circumferential path and during time intervals corresponding to the second set of arcuate sections, the first pattern is read to generate a first read signal amplitude measurement A0, and during time intervals corresponding to the first set of arcuate sections, the first pattern is read to generate a second read signal amplitude measurement A1. At step 22 a track density is selected in response to A0 and A1, wherein at step 24 the track density is for use in writing embedded servo sectors to the disk surface.

The method of writing a primary pattern and an interference pattern radially offset from the primary pattern provides an accurate measurement of the track pitch capability of the combined width of the read and write elements. Further, by writing the interference pattern in sections, the first and second read signal amplitude measurements A0 and A1 can be generated by reading the first circumferential path over one revolution of the disk.

The read signal amplitude measurements A0 and A1 may be generated using any suitable technique, such as sampling the read signal at a predetermined time interval and summing the sample values. Further, any suitable mathematical relationship may be employed to generate a track pitch value (TPV) for selecting an appropriate track density. For example, in one embodiment a TPV is generated using the mathematical relationship A1/A0, and in an alternative embodiment generated using the mathematical relationship (A0−A1)/A0. In addition, the second pattern may be written at any suitable radial offset from the center of the first circumferential path. For example, the second pattern may be written at a radial offset equal to 70% of the width of a data track at a predetermined track density. Still further, the process may be executed by an external servo writer or using the internal circuitry of the disk drive during a self-servo writing operation.

The first and second patterns may comprise any suitable frequency components. In one embodiment, the first pattern comprises a first fundamental frequency and the second pattern comprises a second fundamental frequency substantially different than the first fundamental frequency. For example, in one embodiment, the first pattern writes a predetermined pattern of magnetic transitions on the disk surface and the second pattern writes a DC erase signal on the disk surface. If the second pattern writes a number of magnetic transitions on the disk surface (i.e., comprises a non-DC fundamental frequency), a band-pass filter may be employed to read the first pattern wherein the band-pass filter passes the fundamental frequency of the first pattern.

Figure 3:
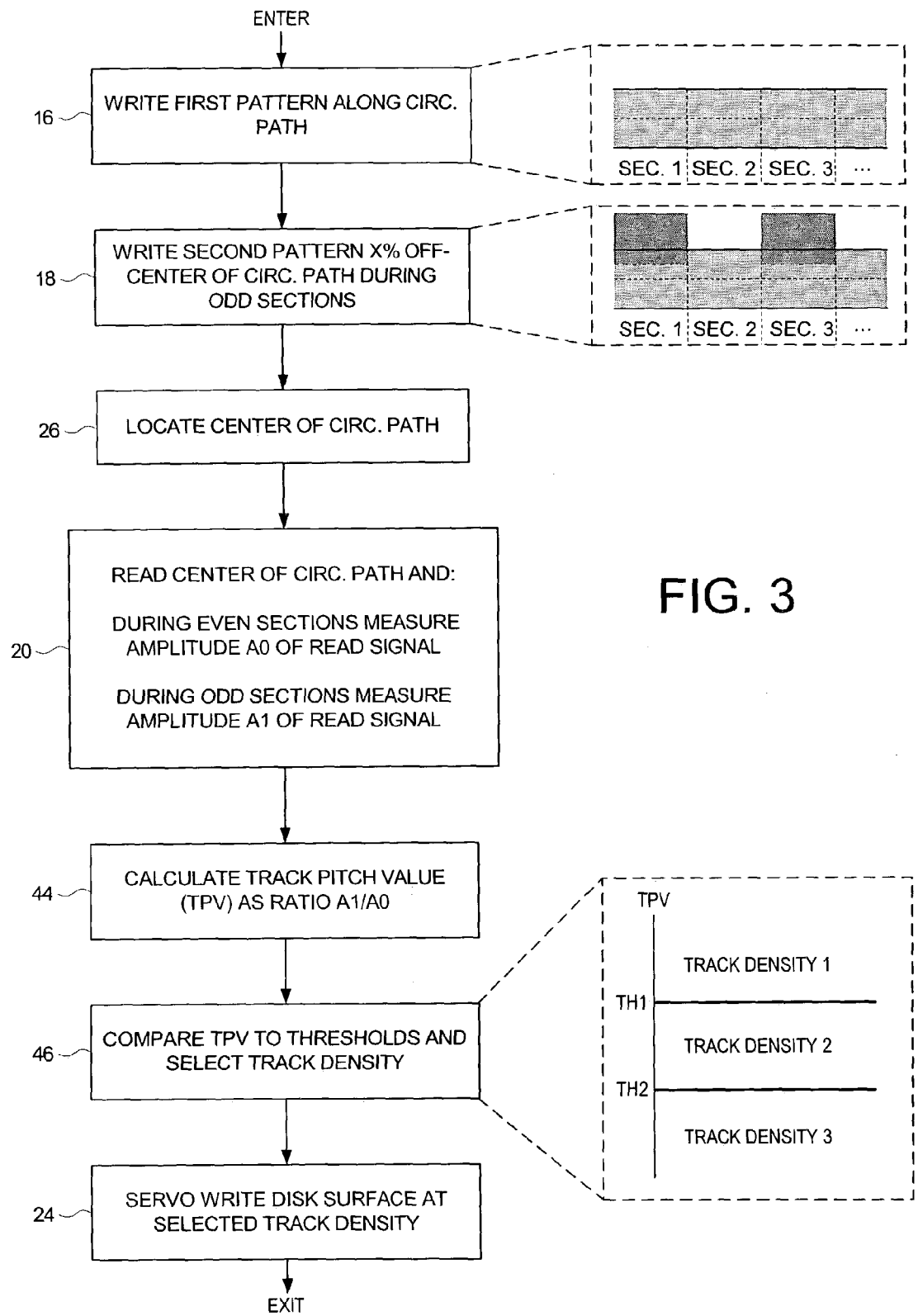
FIG. 3 is a more detailed flow diagram according to an embodiment of the present invention wherein the first sections comprise even intervals and the second sections comprise odd intervals.
Figure 4:
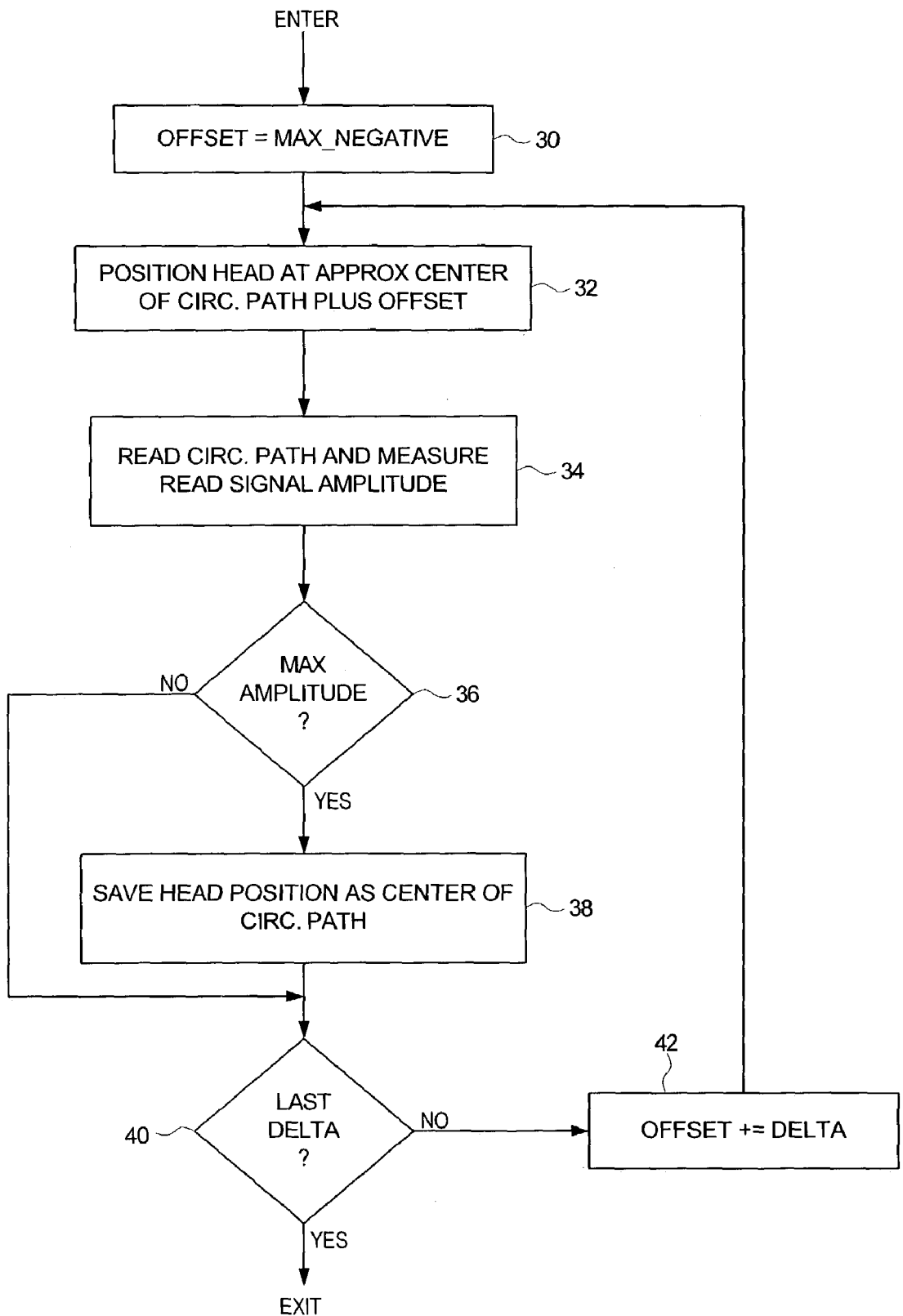
FIG. 4 is a flow diagram according to an embodiment of the present invention for locating a center of the primary pattern before reading the primary pattern.

FIG. 3 shows a more detailed flow diagram according to an embodiment of the present invention wherein at step 26 the center of the first circumferential path is located before reading the first pattern. This step is necessary in disk drives employing a head comprising a read element offset from the write element, such as with a magnetoresistive head. Since the offset is unknown, the center of the first circumferential path with respect to the read element is determined before reading the first pattern. In one embodiment, the step of locating the center of the first circumferential path comprises the steps of positioning the head at different locations with respect to the first circumferential path to read the first pattern, wherein the center of the first circumferential path is selected as the head position that maximizes the read signal amplitude. This is illustrated by the flow diagram of FIG. 4 wherein at step 30 an OFFSET value is initialized to a maximum negative value. At step 32 the head is positioned at approximately the center of the first circumferential path plus the OFFSET. At step 34 the first pattern is read from the first circumferential path and a read signal amplitude measured. If at step 36 the read signal amplitude is the maximum, then at step 38 the head position is saved and used as the center of the first circumferential path. If at step 40 there are more deltas to consider, then at step 42 a delta is added to the OFFSET and the process repeated starting at step 32.

Referring again to the flow diagram of FIG. 3, having located the center of the first circumferential path, at step 20 the first pattern is read from the center of the first circumferential path during the respective time intervals to generate the first and second read signal amplitude measurements A0 and A1. At step 44 a TPV is calculated as the ratio A1/A0 and at step 46 the TPV is compared to thresholds to select the appropriate track density to servo write the disk surface. In the embodiment illustrated in step 46 of FIG. 3, the disk surface may be written with one of three track density values as selected by comparing the TPV to two thresholds TH1 and TH2. However, any suitable resolution may be employed for the track density values, and any suitable technique employed for mapping the TPV into the appropriate track density (e.g., converting the TPV into an index for indexing a table or an array).

Figure 5:
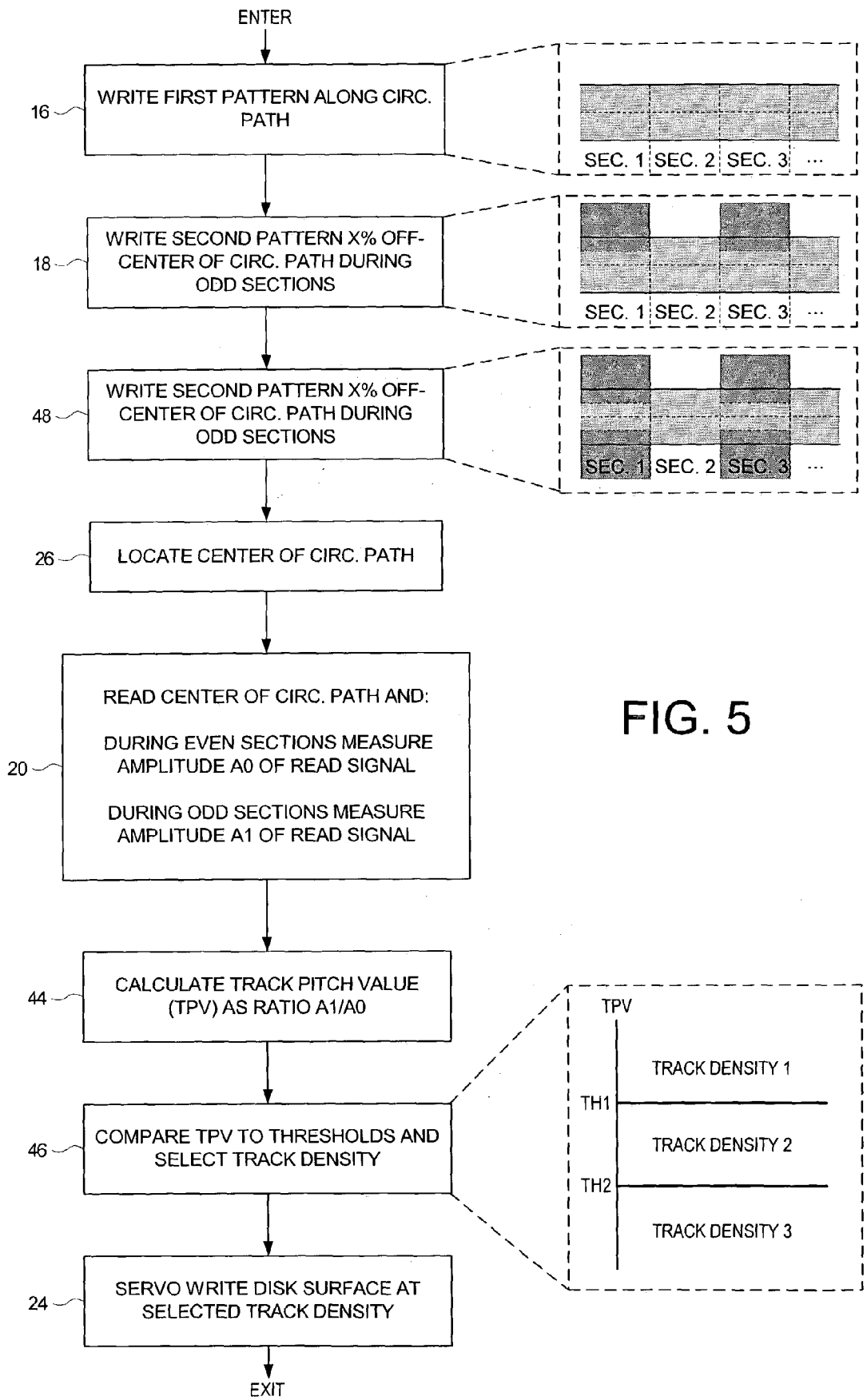
FIG. 5 is a flow diagram according to an embodiment of the present invention wherein the interference pattern is written on both sides of the primary pattern during the odd intervals.

FIG. 5 is a flow diagram which augments the flow diagram of FIG. 3 by writing the second pattern on both sides of the first circumferential path. That is, at step 48 the second pattern is written on the opposite side of the circumferential path during time intervals corresponding to the first set of arcuate sections (the odd sections) similar to step 18. Writing the second pattern on both sides of the first circumferential path may provide a more accurate measurement of the track pitch capability of the combined width of the read and write elements.

We claim:

1. A method for selecting a track density for a disk surface of a disk drive, the disk drive comprising a disk including the disk surface and a head actuated over the disk surface, the method comprising the steps of:

(a) writing a first pattern along a first circumferential path of the disk surface, wherein the first circumferential path comprises a first set of arcuate sections interleaved with a second set of arcuate sections;

(b) writing a second pattern along a second circumferential path during time intervals corresponding to the first set of arcuate sections, wherein the second circumferential path is radially offset from the first circumferential path;

(c) positioning the head substantially over the center of the first circumferential path and:

during time intervals corresponding to the second set of arcuate sections, reading the first pattern to generate a first read signal amplitude measurement A0; and during time intervals corresponding to the first set of arcuate sections, reading the first pattern to generate a second read signal amplitude measurement A1; and (d) selecting a track density in response to A0 and A1, wherein the track density is for use in writing embedded servo sectors to the disk surface.

2. The method as recited in claim 1, further comprising the step of locating the center of the first circumferential path prior to the steps of reading the first pattern to generate the first and second read signal amplitude measurements A0 and A1, wherein the step of locating the center of the first circumferential path comprises the steps of:

(a) iteratively positioning the head at different locations with respect to the first circumferential path and reading the first pattern; and (b) selecting as the center of the first circumferential path the head position that maximizes the read signal amplitude.

3. The method as recited in claim 1, wherein the track density is selected in response to a ratio of A1 to A0.

4. The method as recited in claim 1, wherein the first pattern comprises a first fundamental frequency and the second pattern comprises a second fundamental frequency substantially different than the first fundamental frequency.

5. The method as recited in claim 4, wherein the first pattern writes a predetermined pattern of magnetic transitions on the disk surface and the second pattern writes a DC erase signal to the disk surface.

6. The method as recited in claim 1, wherein prior to the step of positioning the head substantially over the center of the first circumferential path and reading the first pattern to generate the first and second read signal amplitude measurement A0 and A1, further comprising the step of positioning the head substantially over a center of a third circumferential path and writing the second pattern along the third circumferential path during time intervals corresponding to the first set of arcuate sections, wherein:

(a) the second circumferential path is radially offset in a first direction from the first circumferential path;

(b) the third circumferential path is radially offset in a second direction from the first circumferential path; and (c) the first direction is substantially opposite the second direction.

* * * * *